(12) United States Patent
Doida

(10) Patent No.: US 8,526,057 B2
(45) Date of Patent: *Sep. 3, 2013

(54) IMAGE PROCESSING APPARATUS AND IMAGE PROCESSING METHOD

(75) Inventor: Shigeru Doida, Kawasaki (JP)

(73) Assignee: Nikon Corporation, Tokyo (JP)

( * ) Notice: Subject to any disclaimer, the term of this patent is extended or adjusted under 35 U.S.C. 154(b) by 350 days.

This patent is subject to a terminal disclaimer.

(21) Appl. No.: 12/980,970

(22) Filed: Dec. 29, 2010

(65) Prior Publication Data

US 2011/0228295 A1    Sep. 22, 2011

(30) Foreign Application Priority Data

Jan. 13, 2010 (JP) .................................. 2010-005071
Jun. 25, 2010 (JP) .................................. 2010-145053

(51) Int. Cl.
- *H04N 1/60* (2006.01)
- *H04N 5/228* (2006.01)
- *H04N 5/235* (2006.01)
- *G06K 9/40* (2006.01)
- *G06K 9/36* (2006.01)

(52) U.S. Cl.
USPC ...... 358/1.9; 348/222.1; 348/229.1; 382/255; 382/274; 382/284

(58) Field of Classification Search
USPC ......................................................... 358/1.9
See application file for complete search history.

(56) References Cited

U.S. PATENT DOCUMENTS

| | | | | |
|---|---|---|---|---|
| 5,455,621 A | * | 10/1995 | Morimura | 348/229.1 |
| 2007/0269132 A1 | * | 11/2007 | Duan et al. | 382/274 |
| 2011/0090372 A1 | * | 4/2011 | Doida | 348/239 |

FOREIGN PATENT DOCUMENTS

JP       B2-3956311       5/2007

* cited by examiner

*Primary Examiner* — Marivelisse Santiago Cordero
*Assistant Examiner* — Moustapha Diaby
(74) *Attorney, Agent, or Firm* — Oliff & Berridge, PLC

(57) ABSTRACT

An image processing apparatus includes a selecting unit selecting a reference image from input images, a calculating unit calculating brightness ratios of the remaining input images as gains, a calculating unit calculating first weights for the remaining input images and calculating a second weight based on a brightness of image data as a synthesized image of the input image with the first weights, a generating unit generating a high-contrast image by performing weighting synthesis on the input images using the first weights and the second weight, a preparing unit preparing a tone conversion curve based on a brightness distribution of the high-contrast image and a brightness distribution as conversion target, and a generating unit performing the tone conversion on the high-contrast image based on the tone conversion curve, and generating the output image having the narrow tonal range.

18 Claims, 6 Drawing Sheets

IMAGE PROCESSING APPARATUS AND IMAGE PROCESSING METHOD

CROSS REFERENCE TO RELATED APPLICATION

This application is based upon and claims the benefit of priorities from Japanese Patent Application No. 2010-005071, filed on Jan. 13, 2010, and Japanese Patent Application No. 2010-145053, filed on Jun. 25, 2010, the entire contents of which are incorporated herein by reference.

BACKGROUND

1. Field

The present application relates to an image processing apparatus and an image processing method.

2. Description of the Related Art

Conventionally, as a method of obtaining an image with good contrast, there has been formed a synthetic image whose dynamic range is extended by synthesizing a plurality of pieces of input images obtained by shooting a same scene and having different exposure amounts. Further, there has been proposed a method of performing tone conversion based on the synthetic image with wide tonal range (high-contrast image), and generating an output image as a final result having a narrower tonal range than the synthetic image (Japanese Patent No. 3956311, for example).

With the use of this method, there is generated the output image in which information (particularly, tone information) of the high-contrast image with wide tonal range is held, which enables to obtain an image with good contrast.

In the above-described conventional method, it is designed to perform the tone conversion for generating the output image as a final result, in accordance with a conversion characteristic calculated based on features, concretely, three feature points of a minimum brightness value, an intermediate brightness value and a maximum brightness value of a brightness distribution of the high-contrast image (synthetic image). However, in the tone conversion, there still have been problems such that a tone jump occurs, and particularly, a tone expression in a low brightness part and a high brightness part of the image becomes unnatural. For this reason, it was not possible to obtain an image with good contrast as an output image being a final result.

SUMMARY

The present application is for solving the problems of the conventional art described above. A proposition of the present application is to provide an image processing apparatus and an image processing method capable of obtaining an image with good contrast as an output image being a final result.

An image processing apparatus of the present application generating, based on a high-contrast image being a synthetic image whose dynamic range is extended and having a wide tonal range achieved by synthesizing a plurality of pieces of input images obtained by shooting a same scene and having different exposure amounts, an output image having a narrower tonal range than the high-contrast image, the image processing apparatus includes a selecting unit selecting a reference image from the plurality of pieces of input images based on information of brightness components of the plurality of pieces of input images, a gain calculating unit calculating, for each of remaining input images which are the plurality of pieces of input images excluding the reference image, a brightness ratio of each of the remaining input images to the reference image as a gain, based on the information of the brightness components of the plurality of pieces of input images, a weight calculating unit calculating first weights to be applied to the remaining input images based on the gain being calculated and information of a brightness component of the reference image, and calculating a second weight based on information of a brightness component of image data as a result of performing weighting synthesis calculation on the plurality of pieces of input images using the first weights, an intermediate image generating unit generating the high-contrast image by performing weighting synthesis on the plurality of pieces of input images using the first weights and second weight being calculated; a preparing unit preparing, based on information of a shape of a brightness distribution of the high-contrast image being generated and information of a shape of a predetermined brightness distribution as a conversion target, a tone conversion curve indicating a characteristic of tone conversion, and an output image generating unit performing the tone conversion on the high-contrast image based on the tone conversion curve being prepared, and generating the output image having the narrower tonal range than the high-contrast image.

The selecting unit may select, based on information of brightness components of reduced images obtained by reducing each of the plurality of pieces of input images, one piece of input image having a widest effective range of a brightness distribution among the plurality of pieces of input images as the reference image.

The gain calculating unit may calculate, for each of the remaining input images, the brightness ratio of each of the remaining input images to the reference image as the gain, based on information of brightness components of reduced images obtained by reducing each of the plurality of pieces of input images.

The weight calculating unit may, with respect to each of the remaining input images whose value of the calculated gain is smaller than a predetermined value, calculates the first weight to increase a weight for a high brightness part of the remaining input image, and, with respect to each of the remaining input images whose value of the calculated gain is larger than the predetermined value, calculates the first weight to increase a weight for a low brightness part of the remaining input image.

The weight calculating unit may calculate a ratio determined to make a maximum brightness value of the image data as a result of performing the weighting synthesis calculation on the plurality of pieces of input images using the first weights correspond to a maximum value in a predetermined "N"-bit tone as a result of extending a dynamic range, as the second weight.

The preparing unit may extract, from the information of the shape of the brightness distribution of the high-contrast image being generated and the information of the shape of the predetermined brightness distribution as the conversion target, information indicating a correspondence between a brightness value of the high-contrast image being a conversion source and a brightness value of the output image being a conversion destination, and prepares the tone conversion curve indicating the characteristic of the tone conversion based on the information being extracted.

The preparing unit may prepare the tone conversion curve indicating the characteristic of the tone conversion, based on information of a shape of a brightness distribution formed by only pixels that belong to a tone range predetermined or specified by a user out of a tone range of the high-contrast image and the information of the shape of the brightness distribution as the conversion target.

The information of the shape of the brightness distribution may be information of a shape of an accumulated histogram.

The high-contrast image being the synthetic image having the wide tonal range may be an image whose number of tones is larger than number of tones of the plurality of pieces of input images.

Further, an image processing method of the present application generating, based on a high-contrast image being a synthetic image whose dynamic range is extended and having a wide tonal range achieved by synthesizing a plurality of pieces of input images obtained by shooting a same scene and having different exposure amounts, an output image having a narrower tonal range than the high-contrast image, the image processing method includes a selecting step selecting a reference image from the plurality of pieces of input images based on information of brightness components of the plurality of pieces of input images, a gain calculating step calculating, for each of remaining input images which are the plurality of pieces of input images excluding the reference image, a brightness ratio of each of the remaining input images to the reference image as a gain, based on the information of the brightness components of the plurality of pieces of input images, a weight calculating step calculating first weights to be applied to the remaining input images based on the gain being calculated and information of a brightness component of the reference image, and calculating a second weight based on information of a brightness component of image data as a result of performing weighting synthesis calculation on the plurality of pieces of input images using the first weights, an intermediate image generating step generating the high-contrast image by performing weighting synthesis on the plurality of pieces of input images using the first weights and second weight being calculated, a preparing step preparing, based on information of a shape of a brightness distribution of the high-contrast image being generated and information of a shape of a predetermined brightness distribution as a conversion target, a tone conversion curve indicating a characteristic of tone conversion, and an output image generating step performing the tone conversion on the high-contrast image based on the tone conversion curve being prepared, and generating the output image having the narrower tonal range than the high-contrast image.

The selecting step may select, based on information of brightness components of reduced images obtained by reducing each of the plurality of pieces of input images, one piece of input image having a widest effective range of a brightness distribution among the plurality of pieces of input images as the reference image.

The gain calculating step may calculate, for each of the remaining input images, the brightness ratio of each of the remaining input images to the reference image as the gain, based on information of brightness components of reduced images obtained by reducing each of the plurality of pieces of input images.

The weight calculating step may, with respect to each of the remaining input images whose value of the calculated gain is smaller than a predetermined value, calculates the first weight to increase a weight for a high brightness part of the remaining input image, and, with respect to each of the remaining input images whose value of the calculated gain is larger than the predetermined value, calculates the first weight to increase a weight for a low brightness part of the remaining input image.

The weight calculating step may calculate a ratio determined to make a maximum brightness value of the image data as a result of performing the weighting synthesis calculation on the plurality of pieces of input images using the first weights correspond to a maximum value in a predetermined "N"-bit tone as a result of extending a dynamic range, as the second weight.

The preparing step may extract, from the information of the shape of the brightness distribution of the high-contrast image being generated and the information of the shape of the predetermined brightness distribution as the conversion target, information indicating a correspondence between a brightness value of the high-contrast image being a conversion source and a brightness value of the output image being a conversion destination, and prepares the tone conversion curve indicating the characteristic of the tone conversion based on the information being extracted.

The preparing step may prepare the tone conversion curve indicating the characteristic of the tone conversion, based on information of a shape of a brightness distribution formed by only pixels that belong to a tone range predetermined or specified by a user out of a tone range of the high-contrast image and the information of the shape of the brightness distribution as the conversion target.

The information of the shape of the brightness distribution may be information of a shape of an accumulated histogram.

The high-contrast image being the synthetic image having the wide tonal range may be an image whose number of tones is larger than number of tones of the plurality of pieces of input images.

DETAILED DESCRIPTION OF THE EMBODIMENT

Figure 1:
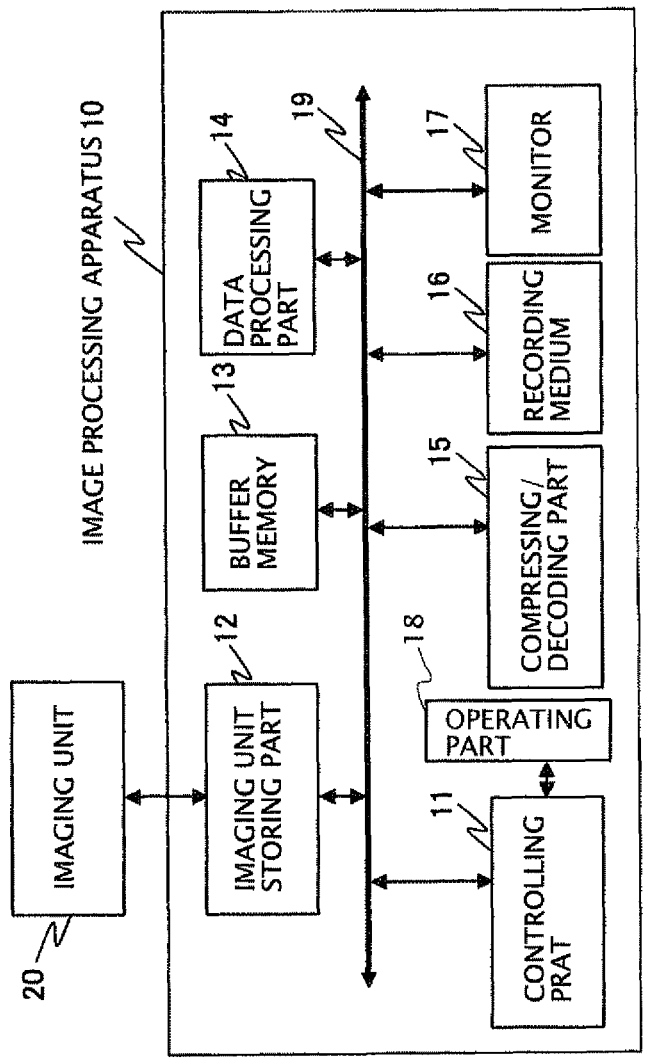
FIG. 1 is a block diagram illustrating a configuration of an image processing apparatus of an embodiment.

Hereinafter, an embodiment of the present application will be described. FIG. 1 is a block diagram illustrating a configuration of an image processing apparatus of the present embodiment. As illustrated in FIG. 1, the image processing apparatus of the present embodiment is formed of an image processing apparatus 10 and an imaging unit 20 connected to the apparatus.

The image processing apparatus 10 has a controlling part 11, an imaging unit storing part 12, a buffer memory 13, a data processing part 14, a compressing/decoding part 15, a recording medium 16, a monitor 17, an operating part 18 and a system bus 19. Here, the controlling part 11, the imaging unit storing part 12, the buffer memory 13, the data processing part 14, the compressing/decoding part 15, the recording medium 16 and the monitor 17 are connected via the system bus 19. Further, the operating part 18 is connected to the controlling part 11.

The imaging unit 20 is connected to the image processing apparatus 10 via a storing port (not illustrated) of the imaging unit storing part 12. Note that the connection is made by using a communication cable based on a standard such as IEEE1394 and USB.

The imaging unit 20 is formed of an imaging sensor having an imaging area obtained by forming a large number of light-receiving elements (pixels) arranged in a two-dimensional matrix form on a semiconductor substrate, a signal processing circuit performing signal processing such as clamp processing, sensitivity adjustment (gain adjustment) and A/D conversion on an image signal output from the imaging sensor, and outputting the signal-processed image data to the image processing apparatus 10, and the like. Note that the imaging sensor of the imaging unit 20 is formed of a CCD-type or a CMOS-type imaging sensor, for example.

Further, the imaging unit 20 has a shooting lens formed of a plurality of lens groups including a focus lens and a zoom lens, and a lens driving part performing focusing adjustment and zooming adjustment by moving the shooting lens in an optical axis direction. Note that the focusing adjustment and the zooming adjustment of the shooting lens are performed in accordance with an instruction from the controlling part 11 of the image processing apparatus 10.

Based on an instruction from the controlling part 11 of the image processing apparatus 10, the imaging unit 20 shoots an image of a subject image formed on the imaging area. Control of AE (automatic exposure) and AF (automatic focusing) at the time of shooting is conducted by the imaging unit 20 based on the instruction from the controlling part 11 of the image processing apparatus 10. Alternatively, the imaging unit 20 and the controlling part 11 of the image processing apparatus 10 collaborate to conduct the control. Image data obtained through the shooting and output from the imaging unit 20 is output to the buffer memory 13 of the image processing apparatus 10 via the imaging unit storing part 12.

In the buffer memory 13, the image data output from the imaging unit 20 is temporarily recorded. Further, image data formed in a process of processing conducted by the controlling part 11, and so on are also temporarily recorded in the buffer memory 13.

In accordance with an instruction from the controlling part 11, the data processing part 14 performs image processing such as defective pixel correction, shading correction, white balance adjustment, interpolation, edge enhancement and gamma conversion, on the image data recorded in the buffer memory 13. Note that the data processing part 14 is formed as an ASIC or the like.

The compressing/decoding part 15 performs, in accordance with an instruction from the controlling part 11, compressing processing on the image data in the buffer memory 13. Note that the compressing processing is conducted according to a PEG (Joint Photographic Experts Group) format or the like.

The recording medium 16 is formed of a memory card, a hard disk, an optical disk (DVD or the like), or the like. Note that the recording medium 16 may be one built in the image processing apparatus 10, one detachably attached to the apparatus, or one provided external to the apparatus. When the recording medium 16 is provided external to the apparatus, the recording medium 16 and the image processing apparatus 10 are electrically connected via wire or wireless.

The monitor 17 is a display device formed of an LCD display, a CRT display or the like. Note that the monitor 17 may be one built in the image processing apparatus 10, or one provided external to the apparatus. When the monitor 17 is provided external to the apparatus, the monitor 17 and the image processing apparatus 10 are electrically connected via wire.

In accordance with an instruction from the controlling part 11, the monitor 17 displays contents of an image before the image processing, displays contents of the image after the image processing as a result of image processing, and further, it displays an image processing menu screen (GUI) which allows a user to instruct the contents of image processing performed on the image, and so on.

The operating part 18 includes various input devices such as a keyboard and pointing devices like a mouse, a track pad and the like, with which the user makes instructions to the controlling part 11. By operating these input devices, the user can make the instruction regarding the contents of the image processing performed on the image, the instruction to execute the image processing, and the like to the controlling part 11.

Incidentally, in the image processing apparatus of the present embodiment, a synthetic image whose dynamic range is extended is formed by synthesizing a plurality of pieces of input images obtained by shooting a same scene and having different exposure amounts, tone conversion is performed based on the synthetic image (high-contrast image), and finally, an output image having a narrower tonal range than the synthetic image is generated. Accordingly, there is generated the output image with good contrast in which information (particularly, tone information) of the high-contrast image with wide tonal range is held.

Note that examples regarding tones of respective images handled by the present image processing apparatus can be cited as follows. For example, an input image has 256 (8-bit) or 1024 (10-bit) tones, a high-contrast image has 1024 (10-bit) or 65536 (16-bit) tones, and an output image has 1024 (10-bit) or 256 (8-bit) tones which are generally easy to handle.

Hereinafter, an operation conducted by the image processing apparatus of the present embodiment regarding the processing will be described with reference to flow charts in FIG. 2 and FIG. 3.

Figure 2:
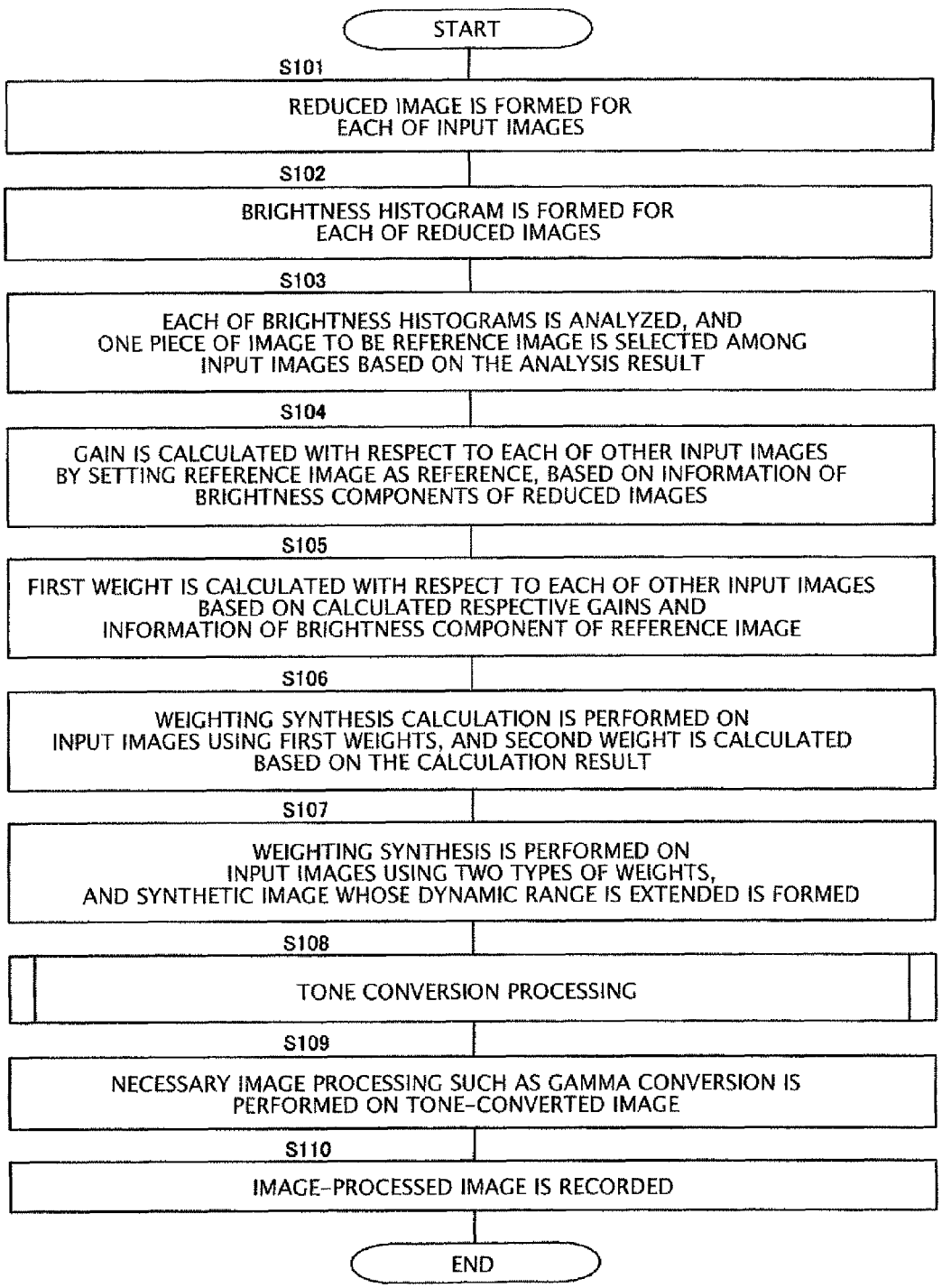
FIG. 2 is a flow chart (1/2) illustrating an operation of the image processing apparatus of the embodiment.
Figure 3:
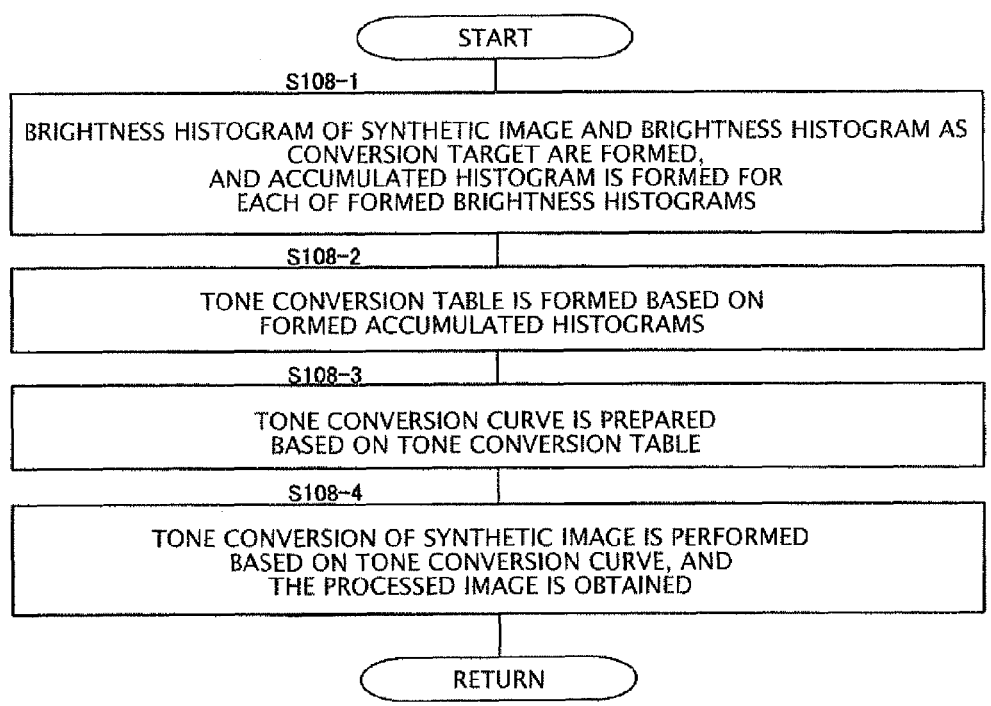
FIG. 3 is a flow chart (2/2) illustrating the operation of the image processing apparatus of the embodiment.

The processing in the flow charts in FIG. 2 and FIG. 3 is called when a plurality of pieces of images obtained by shooting a same scene and having different exposure amounts are output from the imaging unit 20 and obtained (recorded) in the buffer memory 13. When the processing is called, the plurality of pieces of images in the buffer memory 13 are specified as input images (1 to N).

Note that the plurality of pieces of images as described above can be obtained by performing exposure bracketing shooting or the like, for instance. In that case, the exposure bracketing shooting may be performed so that one piece of image among the plurality of pieces of images is shot under an exposing condition determined by AE (automatic exposure) or specified by a user, and further, the other remaining images are shot under a different exposing condition set by using the exposing condition as a reference (reference exposing condition±n steps).

Further, in the processing described below, it is designed to perform processing by inputting an image on which gamma correction (gamma conversion) or the like is not performed, namely, an image whose image signal components are in a state of being directly output from the imaging sensor and thus in a linear characteristic state. For this reason, when images on which the image processing such as the gamma correction (gamma conversion) is performed are used as the input images (1 to N), in order to make the state of image signal components to be the linear characteristic state again, it is set such that inverse gamma correction (inverse gamma conversion) is once performed on the original images, and the resultants are used as the input images (1 to N).

Step 101 (S101): The controlling part 11 forms reduced images for the respective input images (1 to N). For example, the reduced image is formed by taking an average of pixel values of 2×2 pixels or 4×4 pixels in a spatial direction of each of the input images, or the like. Note that the formed reduced images (1 to n) are recorded in an area, in the buffer memory 13, different from an area in which the input images (1 to N) are recorded.

Step 102: The controlling part 11 forms a histogram of brightness component (brightness histogram) for each of the formed reduced images (1 to n).

Step 103: The controlling part 11 analyzes each of the formed brightness histograms, and selects, based on results of the analysis, one piece of image to be a reference image among the input images (1 to N).

Concretely, the number of pixels (i) which is, for instance, 0.1% of the total number of pixels of the reduced image based on which the brightness histogram is formed is first determined. Note that the ratio with respect to the total number of pixels of the reduced image (0.1% or the like) is specified in order not to include a defective pixel of the imaging sensor or pixels in an area other than an area to which pixels forming the image belong and having an outstanding pixel value, a noise or the like, as a calculation target.

Next, by using the formed brightness histogram, here, if it is assumed that an example of brightness histogram in FIG. 4 is used, for instance, search is performed in the histogram from a high brightness side (brightness value "255") to a low brightness side (brightness value "0") of a horizontal axis (brightness) of the histogram, up to a point where a value of a vertical axis (number of pixels) of the brightness histogram matches the previously determined number of pixels (i), and the value of the horizontal axis (brightness value) at the matched point is extracted as a "max (brightness maximum value)". Further, continuously, search is performed in the same brightness histogram from the low brightness side (brightness value "0") to the high brightness side (brightness value "255") of the horizontal axis (brightness) of the brightness histogram, up to a point where the value of the vertical axis (number of pixels) of the brightness histogram matches the previously determined number of pixels (i), and the value of the horizontal axis (brightness value) at the matched point is extracted as a "min (brightness minimum value)".

Further, the input image (one piece) corresponding to the reduced image based on which the brightness histogram having a largest difference between the "max (brightness maximum value)" and the "min (brightness minimum value)" is formed, is selected as the reference image.

As described above, one piece of image having a widest effective range of the brightness distribution is selected as the reference image among the input images (1 to N).

Step 104: The controlling part 11 calculates, based on information of brightness components of the reduced images, a gain for each of the other input images (remaining one or more pieces of input images except the reference image) by setting the reference image as a reference. Concretely, a gain (gain) is calculated through the following (equation 1). Here, $f_Y(x, y)$, $h_Y(x, y)$, and $(x, y)$ in the (equation 1) represent a brightness component of the reduced image of the reference image, a brightness component of the reduced image of the other input image to be a comparison target, and a coordinate position of each pixel in the reduced image, respectively. However, when the bracketing shooting in which the shooting is performed under a previously specified exposing condition is conducted, there is no need to perform the gain calculation.

$$\text{gain} = \frac{\sum [f_Y(x, y) h_Y(x, y)]}{\sum [f_Y(x, y)]^2} \quad (1)$$

Note that when a value of the gain (gain) calculated through the (equation 1) is smaller than 1.0 (gain<1.0), the "other input image" being the calculation target is shot under the exposing condition of underexposure compared to the exposing condition of the reference image. Further, when the value of calculated gain (gain) is larger than 1.0 (gain>1.0), the "other input image" being the calculation target is shot under the exposing condition of overexposure compared to the exposing condition of the reference image.

Step 105: The controlling part 11 calculates, based on each of the calculated gains (gain) and the information of the brightness component of the reference image, a first weight with respect to each of the other input images. Concretely, a weight (W) in accordance with the value of the gain (gain) is calculated through the following (equation 2), and the resultant is set as the first weight. Here, $f_Y(x, y)$ in the (equation 2) represents the brightness component of the reference image. Further, "min" and "max" are the "min (brightness minimum value)" and the "max (brightness maximum value)" determined from the brightness histogram corresponding to the reference image when the reference image is selected in the aforementioned step 103. By using the (equation 2), the first weight is calculated with respect to each of the other input images, by setting the brightness of the reference image as a reference.

$$\begin{cases} W = -2\log_2(\text{gain}) \times \{(f_Y(x, y) - \min)/\text{range}\} & \text{(for gain < 1.0)} \\ W = 1.0 & \text{(for gain = 1.0)} \\ W = -2\log_2(\text{gain}) \times \{(f_Y(x, y) - \min)/\text{range} - 1\} & \text{(for gain > 1.0)} \\ \text{range} = \max - \min \end{cases} \quad (2)$$

Note that according to the (equation 2), with respect to the "other input image" shot under the exposing condition of underexposure compared to the exposing condition of the reference image, the first weight is calculated so as to increase a weight in a high brightness part of the image, based on the calculation under a condition of "when gain<1.0" (but, it is set such that when $f_Y$<min, W is set to 0 regardless of the equation (2), and when $f_Y$>max, W is set to ($-2 \log_2$(gain)) regardless of the equation (2)). This is because information of the "other input image" shot to have a smaller exposure amount than the reference image is good regarding the high brightness part.

Further, with respect to the "other input image" shot under the exposing condition of overexposure compared to the exposing condition of the reference image, the first weight is calculated so as to increase a weight in a low brightness part of the image, based on the calculation under a condition of "when gain>1.0" (but, it is set such that when $f_Y$<min, W is set to (2 $\log_2$(gain)) regardless of the equation (2), and when $f_Y$>max, W is set to 0 regardless of the equation (2)). This is because information of the "other input image" shot to have a larger exposure amount than the reference image is good regarding the low brightness part.

Step 106: The controlling part 11 performs weighting synthesis calculation through the following (equation 3), on the input images (the reference image and the other input images) for each of color components of R (r), G (g), B (b), using the calculated first weights.

$$g_c(x,y) = \{f_c(x,y) + W_1 h_{1c}(x,y) \sim W_{n-1} h_{n-1c}(x,y)\}/(1.0 + W_1 \sim W_{n-1})$$

$$c = \{r, g, b\} \quad (3)$$

Note that in the (equation 3), $f_c(x, y)$ represents the "reference image", $h_{1c}(x, y)$ to $h_{n-1c}(x, y)$ represent the other input images (1 to N−1, namely, remaining one or more pieces of input images except the reference image). Further, $W_1$ to $W_{n-1}$ represent the first weights calculated in the aforementioned step 105 with respect to the respective other input images (1 to N−1), "1.0" represents the weight with respect to the reference image, "n" represents the number of pieces (N) of input images, and "c" represents each of the color components of R (r), G (g), B (b). Further, "$g_c(x, y)$" is a calculation result of the weighting synthesis calculation obtained for each of the color components of R (r), G (g), B (b), namely, image data after the synthesis.

After performing the weighting synthesis calculation, the controlling part 11 calculates a second weight based on the calculation result.

Concretely, by using the following (equation 4), brightness data $g_Y(x, y)$ is first calculated based on the image data of $g_r(x, y)$, $g_g(x, y)$, $g_b(x, y)$ being the calculation result. Next, a maximum value of brightness is extracted from the calculated brightness data $g_Y(x, y)$ using a function "Max ( )". Subsequently, a ratio that makes the extracted maximum value of brightness correspond to a maximum value in a predetermined "N"-bit tone, which is, for instance, "65535" being a maximum value when "N=16" bit, is calculated as a second weight "NbitW".

$$g_Y(x, y) = 0.299 g_r(x, y) + 0.587 g_g(x, y) + 0.114 g_b(x, y) \quad (4)$$

$$NbitW = \frac{2^N}{\text{Max}(g_Y(x, y))}$$

Step 107: The controlling part 11 performs weighting synthesis through the following (equation 5), using two types of weights of the calculated first weights and second weight, on the input images (the reference image and the other input images) for each of the color components of R (r), G (g), B (b), thereby forming a synthetic image (high-contrast image) whose dynamic range is extended to a tonal range represented by the aforementioned predetermined "N"-bit tone.

$$g_c(x,y) = \{NbitW(f_c(x,y) + W_1 h_{1c}(x,y) \sim W_{n-1} h_{n-1c}(x,y))\}/(1.0 + W_1 \sim W_{n-1})$$

$$c = \{r, g, b\} \quad (5)$$

Note that in the (equation 5), $g_c(x, y)$ represents the formed high-contrast image, $f_c(x, y)$ represents the "reference image", $h_{1c}(x, y)$ to $h_{n-1c}(x, y)$ represent the other input images (1 to N−1, namely, remaining one or more pieces of input images except the reference image). Further, $W_1$ to $W_{n-1}$ represent the first weights calculated in the aforementioned step 105 with respect to the respective other input images (1 to N−1), "1.0" represents the weight with respect to the reference image, "n" represents the number of pieces (N) of input images, "c" represents each of the color components of R (r), G (g), B (b), and "NbitW" represents the second weight calculated in the aforementioned step 106.

As described above, in the image processing apparatus of the present embodiment, the weights are calculated based only on the brightness components (aforementioned steps 105, 106), and the weights are applied to all of the color components of R (r), G (g), B (b) of the input images, thereby conducting the weighting synthesis processing (present step 107). For this reason, color balances of the individual input images are securely reflected, in a state of being maintained as they are, on the formed high-contrast image.

Further, if, different from the above description, the high-contrast image is generated based on each of the color components of R (r), G (g), B (b) of the input images (concretely, all of the above-described processings conducted based on the brightness components (except the processing of calculating the second weight in step 106) are replaced with processings for each of the color components), it becomes possible to more effectively express the tonal range.

Step 108: The controlling part 11 calls a subroutine for tone conversion processing illustrated in FIG. 3.

(FIG. 3: Tone Conversion Processing)

Step 108-1 (S108-1): The controlling part 11 first sets a brightness distribution as conversion target in the tone conversion, and forms a brightness histogram representing the brightness distribution as conversion target and a brightness histogram representing a brightness distribution of the synthetic image (high-contrast image).

Figure 4A:
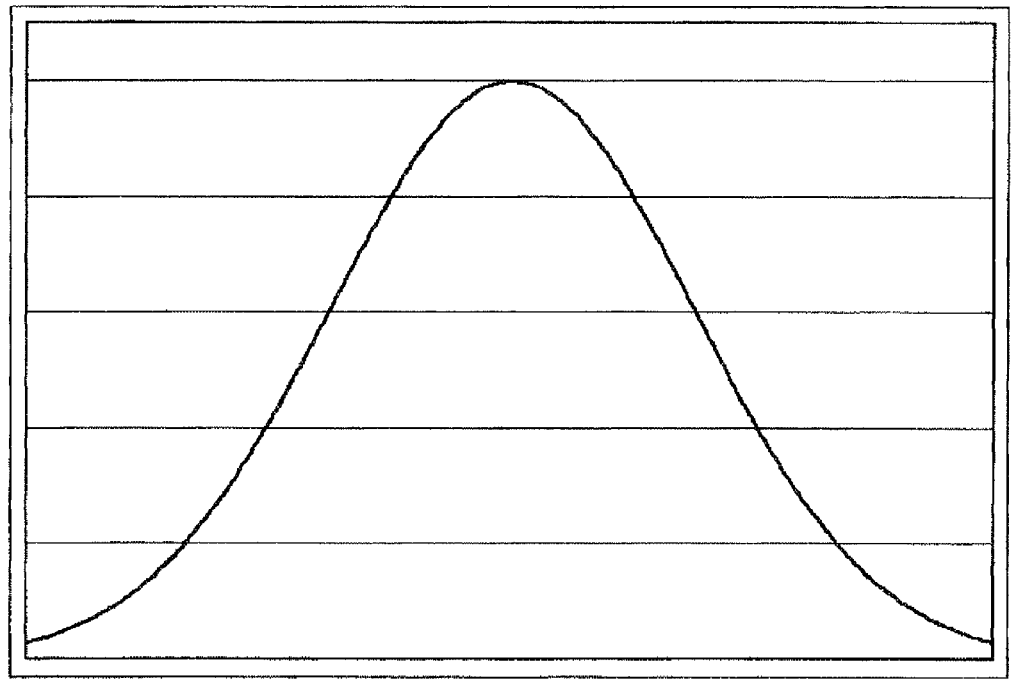
FIG. 4A is a diagram illustrating an example of a brightness histogram as conversion target.
Figure 4B:
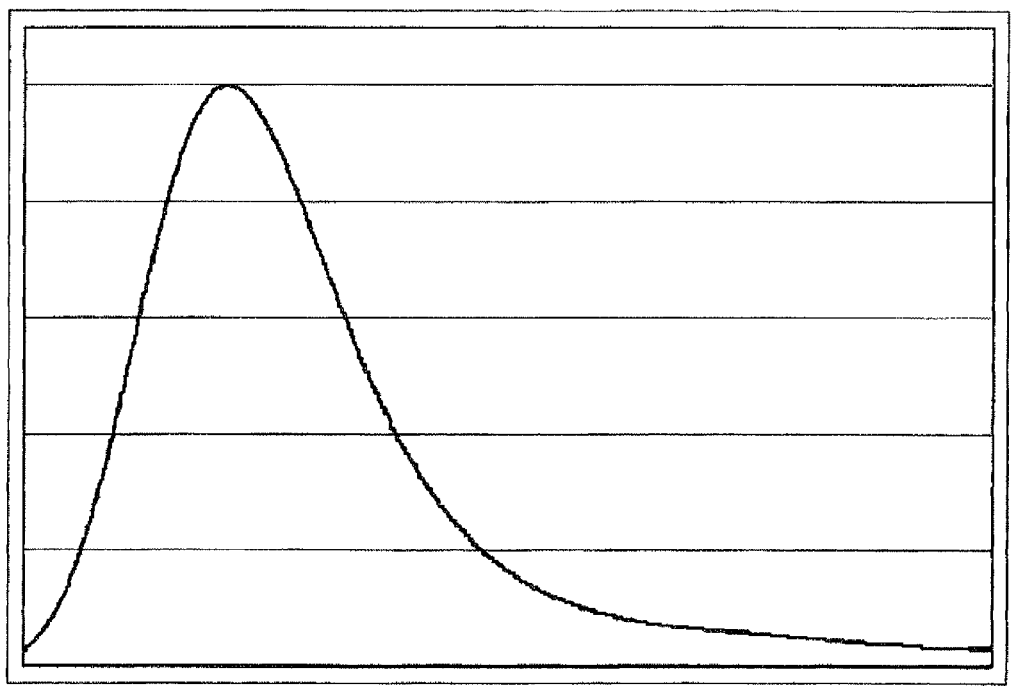
FIG. 4B is a diagram illustrating an example of a brightness histogram in a linear characteristic state.

Here, regarding the brightness histogram as conversion target, based on an assumption that the number of pixels in a middle brightness part becomes large in a brightness histogram of an image with good visual, a brightness distribution such as one represented by a brightness histogram having a Gaussian distribution shape as illustrated in FIG. 4A, for example, is set as conversion target, and a brightness histogram in which image signal components are made to be in a linear characteristic state is formed based on the brightness distribution. For example, if image signal components in FIG. 4A are made to be in a linear characteristic state, there is formed a brightness histogram of a brightness distribution as illustrated in FIG. 4B. Further, the formed brightness histogram in the linear characteristic state may be used as the conversion target.

Note that the synthetic image (high-contrast image) whose dynamic range is extended to the tonal range represented by the aforementioned predetermined "N"-bit tone is formed through the weighting synthesis in the aforementioned step 107, in which not all pieces of information in the "N"-bit tone are effective, and a tone of an attention area in the image may not be expressed.

For this reason, it may be designed such that a range (tone range), out of a tone range of the synthetic image (high-contrast image), output as an output image being a final result, can be specified by a user or the like, for instance.

Further, based on information of a minimum value "outputMin" and a maximum value "outputMax" of the tone range specified by the user, for example, pixels having pixel values which are not included in the range represented by the "outputMin" and the "outputMax", among pixels of the synthetic image (high-contrast image), are set to be excluded from the target for the formation of brightness histogram of the aforementioned synthetic image (high-contrast image).

Accordingly, it becomes possible that a tone part which seems effective in the synthetic image (high-contrast image) or a tone part of the attention area of the image is arbitrarily specified by the user or the like, to be output as the output image being a final result. Note that as the minimum value "outputMin" and the maximum value "outputMax" of the tone range, it is of course possible to use, not the values specified by the user, but previously set preset values of the apparatus.

After forming the brightness histograms as described above, the controlling part 11 forms an accumulated histogram for each of the brightness histogram of the synthetic image and the brightness histogram as conversion target.

Note that regarding the accumulated histogram as conversion target, there is formed one having contents in accordance with the tonal range of the output image as a final result, the tonal range being narrower than that of the synthetic image (high-contrast image). It is also possible that the brightness histogram having contents in accordance with the tonal range of the output image is formed, and the accumulated histogram is formed based on the brightness histogram.

Step 108-2: The controlling part 11 forms a tone conversion table based on the formed accumulated histograms.

Concretely, at first, each of vertical axes (representing the number of pixels) of the accumulated histogram of the synthetic image and the accumulated histogram as conversion target is divided into "n" equal segments. Note that at that time, a range of the vertical axis in which data exists is set to be divided into "n" equal segments.

Here, there is illustrated an example of a case where the vertical axis is divided into "n=16" equal segments.

Figure 5A:
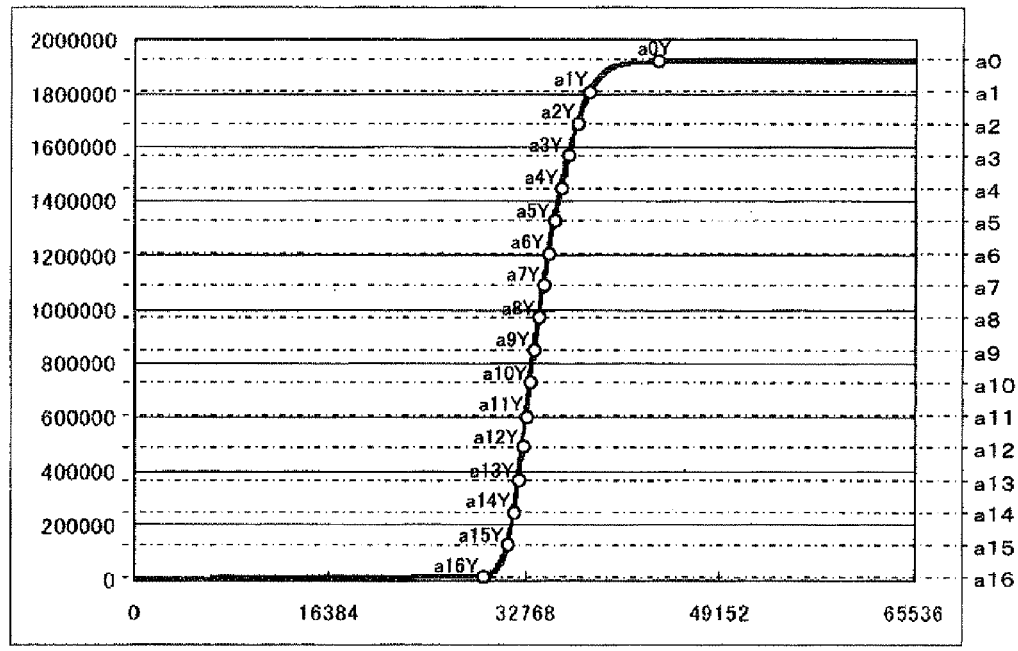
FIG. 5A is a diagram illustrating an example of an accumulated histogram of a synthetic image.

FIG. 5A is an example of accumulated histogram formed with respect to a synthetic image (high-contrast image) having a resolution of 1200×1600 pixels and whose dynamic range is extended to the 16-bit tone. A range of a vertical axis in which data exists is divided into 16 equal segments by borderlines "a0 to a16". Note that in a case of this example, a maximum value of the vertical axis is 1920000 (1200×1600 pixels), and a maximum value of a horizontal axis is 65535 (16-bit tone).

Figure 5B:
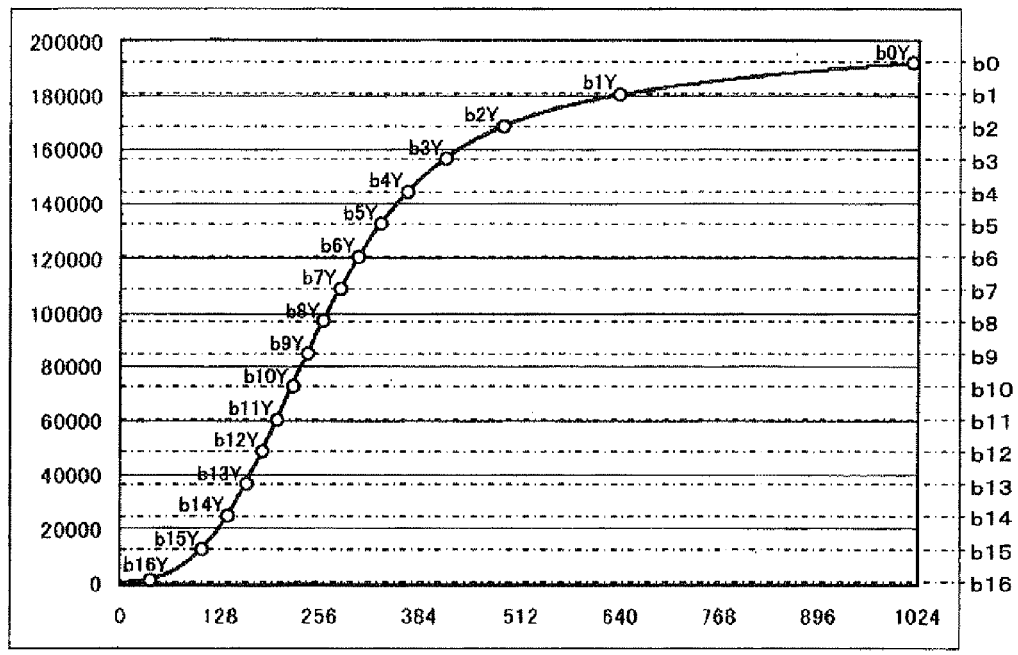
FIG. 5B is a diagram illustrating an example of an accumulated histogram as conversion target.

Further, FIG. 5B is an example of accumulated histogram as conversion target formed in accordance with a tonal range (10-bit tone, in this case) of the output image generated as a final result. A range of a vertical axis in which data exists is divided into 16 equal segments by borderlines "b0 to b16". Note that in a case of this example, a maximum value of a horizontal axis is 1023 (10-bit tone), and further, a maximum value of the vertical axis is 1920000 (1200×1600 pixels) since it is normalized in accordance with the accumulated histogram of the synthetic image (high-contrast image) in FIG. 5A.

Each of the vertical axes of the accumulated histograms is divided into "n" equal segments, and subsequently, brightness values represented by intersection points between the respective borderlines of the equally-divided areas and curves of the accumulated data are made to correspond between the accumulated histogram of the synthetic image and the accumulated histogram as conversion target. In an example of FIG. 5, "a0Y to a16Y" in FIG. 5A illustrating the accumulated histogram of the synthetic image and "b0Y to b16Y" in FIG. 5B illustrating the accumulated histogram as conversion target are made to correspond to one another.

Further, information indicating a correspondence between the brightness values in the accumulated histogram of the synthetic image and the brightness values in the accumulated histogram as conversion target, is formed as a tone conversion table.

As above, the controlling part 11 forms the tone conversion table based on the accumulated histogram of the synthetic image and the accumulated histogram as conversion target.

Figure 6:
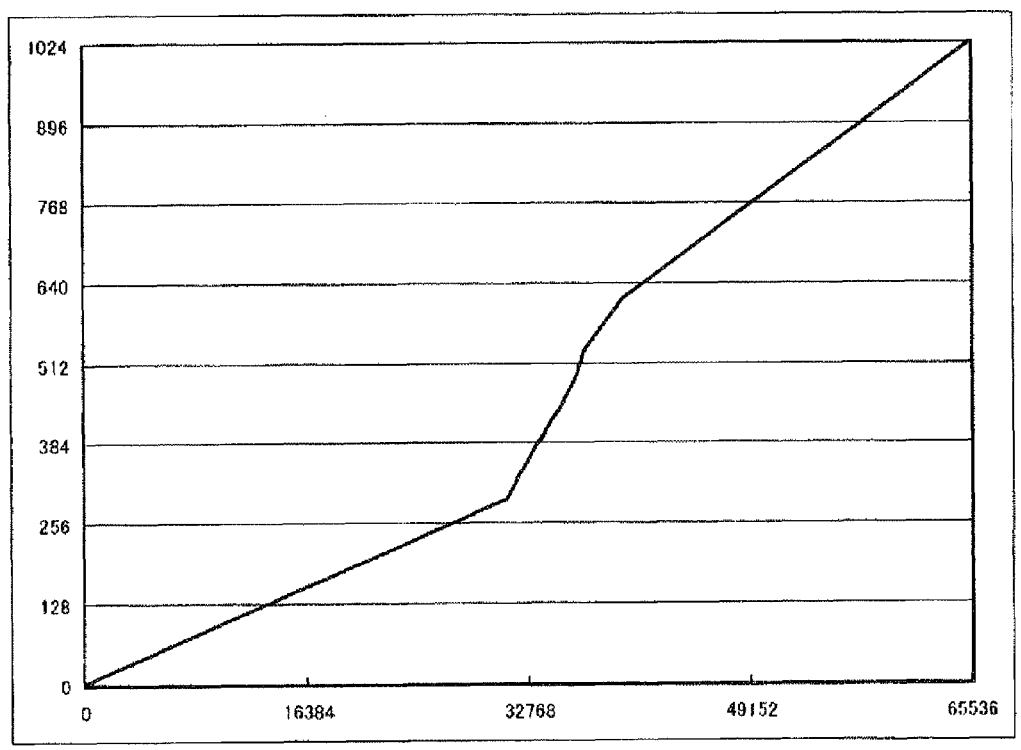
FIG. 6 is a diagram illustrating an example of a tone conversion curve.

Step 108-3: The controlling part 11 prepares a tone conversion curve based on the formed tone conversion table. For example, a tone conversion curve such as illustrated in FIG. 6 is prepared. Concretely, by referring to the tone conversion table, the brightness values in the accumulated histogram of the synthetic image (high-contrast image), which are, for example, "a0Y" to "a16Y" in FIG. 5A are taken on a horizontal axis in FIG. 6, and the brightness values in the accumulated histogram as conversion target, which are, for example, "b0Y" to "b16Y" in FIG. 5B are taken on a vertical axis in FIG. 6. Further, by setting respective intersection points between those "a0Y" to "a16Y" and "b0Y" to "b16Y" as reference points, and, in order not to cause extreme change between the respective reference points, processing such as linear interpolation and smoothing is performed between those respective reference points, thereby preparing the tone conversion curve such as illustrated in FIG. 6.

In the preparation processing of the tone conversion curve, if a curve in which an inclination between the reference points is greater than a ratio between the tonal range of the synthetic image (high-contrast image) and the tonal range of the output image is not prepared, namely, in an example of FIG. 6, if a curve in which an inclination between the reference points is greater than 64 times, being a ratio between the 16-bit tone and the 10-bit tone is not prepared, there is no chance that the tone jump occurs in the following processing of tone conversion using the tone conversion curve.

Note that although this can be naturally understood from the above description, the example of tone conversion curve in FIG. 6 is for performing the tone conversion on the synthetic image (high-contrast image) whose dynamic range is extended to 16-bit tone, and generating an output image of 10-bit tone having a narrower tonal range than the synthetic image.

Step 108-4: The controlling part 11 performs the tone conversion on the synthetic image based on the prepared tone conversion curve, and records the processed image in the buffer memory 13. Accordingly, the output image having a narrower tonal range than the synthetic image (high-contrast image) is obtained in the buffer memory 13. The output image obtained as above corresponds to an image with good contrast in which information (particularly, tone information) of the high-contrast image with wide tonal range is held.

After completing the aforementioned tone conversion processing, the controlling part 20 returns to the processing in the flow chart in FIG. 2, and proceeds to step 109 (S109).

Step 109 (FIG. 2): The controlling part 11 drives the data processing part 14, thereby performing necessary image processing such as gamma conversion on the tone-converted image obtained in the buffer memory 13.

Step 110: The controlling part 11 drives the compressing/decoding part 15 to perform compressing processing on the image-processed image in the buffer memory 13, and records the compression-processed image in the recording medium 16. The controlling part 11 then terminates the processing in the present flow chart.

Note that in the aforementioned step 109, it is also possible to design such that contents of the image-processed image are displayed on the monitor 17.

Operation and Effect of the Embodiment

In the image processing apparatus of the present embodiment, the reduced images are formed for the respective input images (1 to N), and based on the results of analyzing the brightness histograms of the respective reduced images, one piece of image having the widest effective range of the brightness distribution is selected, among the input images, as the reference image. Note that the reduced image is formed by taking an average of pixel values of n×n (n≧2) pixels in a spatial direction of each of the input images, for example.

Next, based on the information of the brightness components of the reduced images, the brightness ratio between the reference image as a reference and each of the other input images (remaining one or more pieces of input images except the reference image) is calculated, as the gain, for each of the other input images, and based on the calculated respective gains and the information of the brightness component of the reference image, the first weights to be applied to the respective other input images are calculated.

Further, the weighting synthesis calculation is performed on the input images (the reference image and the other input images) using the calculated first weights, and the second weight is calculated based on the image data as a result of the calculation.

Subsequently, the weighting synthesis of the input images is performed using the first weights and the second weight, resulting in that the synthetic image (high-contrast image) whose dynamic range is extended to the tonal range represented by the predetermined "N"-bit tone is formed.

As described above, in the image processing apparatus of the present embodiment, the selection of reference image, the calculation of gains, and the calculation of first weights are conducted based on the information of the "reduced images" obtained by reducing the input images (1 to N).

For this reason, even when the input image to be a synthetic target includes a pixel in which noise is generated, the noise component is reduced in the high-contrast image formed through the weighting synthesis. Further, even when the input image includes a pixel having an outstanding pixel value, the tone jump hardly occurs in the high-contrast image formed through the weighting synthesis.

Further, the calculation of second weight is conducted by determining the ratio that makes the maximum brightness value of the image data as a result of performing the weighting synthesis calculation on the input images correspond to the maximum value in the predetermined "N"-bit tone as a result of extending the dynamic range.

Accordingly, the tonal range of the synthetic image (high-contrast image) formed by performing the weighting synthesis on the input images is extended to the tonal range represented by the predetermined "N"-bit tone which is wider than that of the input images, but, in the high-contrast image, natural tone expression is provided, and further, the tone jump hardly occurs.

Further, in the image processing apparatus of the present embodiment, with respect to the other input image whose value of the calculated gain (brightness ratio obtained by setting the reference image as a reference) is small (gain<1.0), namely, the other input image shot under the exposing condition of underexposure compared to the exposing condition of the reference image, the first weight is calculated so as to increase the weight in the high brightness part of the image. This is because the information of the other input image shot under the condition of underexposure to have a smaller exposure amount than the reference image is good regarding the high brightness part.

Further, with respect to the other input image whose value of the calculated gain is large (gain>1.0), namely, the other input image shot under the exposing condition of overexposure compared to the exposing condition of the reference image, the first weight is calculated so as to increase the weight in the low brightness part of the image. This is because the information of the other input image shot under the condition of overexposure to have a larger exposure amount than the reference image is good regarding the low brightness part.

For this reason, even if the input image to be a synthetic target includes a portion with a structure in which the brightness changes smoothly, the tone jump hardly occurs in the high-contrast image formed through the weighting synthesis.

Further, in the image processing apparatus of the present embodiment, one piece of image, among the input images (1 to N), having the widest effective range of the brightness distribution is selected as the reference image, and the calculation of gains and the calculation of first weights are conducted based on the reference image. Further, by using the weights, the weighting synthesis of the reference image and the other input images is performed, thereby forming the high-contrast image.

As described above, in the image processing apparatus of the present embodiment, the image synthesis is performed based on the reference image having the widest effective range of the brightness distribution, so that it is possible to reduce the noise and the tone jump generated in the high-contrast image through the synthesis, compared to the conventional art.

Further, in the image processing apparatus of the present embodiment, the accumulated histogram is formed for each of the brightness histogram representing the brightness distribution as conversion target and the brightness histogram representing the brightness distribution of the synthetic image. Regarding the accumulated histogram as conversion target, there is formed one having contents in accordance with the tonal range of the output image as a final result, the tonal range being narrower than that of the synthetic image (high-contrast image) whose dynamic range is extended to the tonal range represented by the predetermined "N"-bit tone.

Next, the tone conversion table is formed based on the formed accumulated histogram of the synthetic image and accumulated histogram as conversion target. Specifically, each of the vertical axes (number of pixels) of the formed accumulated histogram of the synthetic image and accumulated histogram as conversion target is divided into "n" equal segments, for example, "n=16" equal segments, and the brightness values represented by the intersection points between the borderlines by which the axes are equally divided and the curves of the accumulated data are made to correspond between both the accumulated histograms. Subsequently, the information indicating the correspondence between the brightness values is formed as the tone conversion table.

Further, the tone conversion curve is prepared based on the formed tone conversion table. Specifically, by referring to the tone conversion table, the brightness values in the accumulated histogram of the synthetic image are taken on the horizontal axis, the brightness values in the accumulated histogram as conversion target are taken on the vertical axis, the intersection points (reference points) between the brightness values are determined, and the processing such as linear interpolation and smoothing is performed between the determined respective reference points. Further, the curve as a result obtained through those processings is prepared as the tone conversion curve.

Thereafter, the tone conversion of the synthetic image is performed based on the prepared tone conversion curve. By conducting the tone conversion, there is generated the output image as a final result having a narrower tonal range than the synthetic image (high-contrast image). The image (output image) obtained as above corresponds to an image with good contrast in which information (particularly, tone information) of the high-contrast image with wide tonal range is held.

Therefore, according the image processing apparatus of the present embodiment, it is possible to obtain an image with good contrast, as an output image being a final result.

OTHER FEATURES

The present application can also be applied to other devices capable of performing the exposure bracketing shooting, such as, for example, a digital camera (digital still camera), a digital video camera and a mobile phone. Further, the present application can also be applied to a microscope and the like capable of performing observation of a subject based on an image obtained by using an imaging sensor.

The many features and advantages of the embodiment are apparent from the detailed specification and, thus, it is intended by the appended claims to cover all such features and advantages of the embodiment that fall within the true spirit and scope thereof. Further, since numerous modifications and changes will readily occur to those skilled in the art, it is not desired to limit the inventive embodiment to the exact construction and operation illustrated and described, and accordingly all suitable modifications and equivalents may be resorted to, falling within the scope thereof.

What is claimed is:

1. An image processing apparatus generating, based on a high-contrast image being a synthetic image whose dynamic range is extended and thus having a wide tonal range achieved by synthesizing a plurality of pieces of input images obtained by shooting a same scene and having different exposure amounts, an output image having a narrower tonal range than the high-contrast image, the image processing apparatus comprising:
   a selecting unit selecting a reference image from the plurality of pieces of input images based on information of brightness components of the plurality of pieces of input images;
   a gain calculating unit calculating, for each of one or more remaining input images, which are the plurality of pieces of input images excluding the reference image, a brightness ratio of each of the one or more remaining input images to the reference image as a gain, based on the information of the brightness components of the plurality of pieces of input images;
   a weight calculating unit calculating one or more first weights to be applied to the one or more remaining input images based on the gain being calculated and information of a brightness component of the reference image, and calculating a second weight based on information of a brightness component of image data as a result of performing weighting synthesis calculation on the plurality of pieces of input images using the one or more first weights;
   an intermediate image generating unit generating the high-contrast image by performing weighting synthesis on the plurality of pieces of input images using the one or more first weights and the second weight being calculated;
   a preparing unit preparing, based on information of a shape of a brightness distribution of the high-contrast image being generated and information of a shape of a predetermined brightness distribution as a conversion target, a tone conversion curve indicating a characteristic of tone conversion; and
   an output image generating unit performing the tone conversion on the high-contrast image based on the tone conversion curve being prepared, and generating the output image having the narrower tonal range than the high-contrast image.

2. The image processing apparatus according to claim 1, wherein
   the selecting unit selects, based on information of brightness components of reduced images obtained by reducing each of the plurality of pieces of input images, one piece of input image having a widest effective range of a brightness distribution among the plurality of pieces of input images as the reference image.

3. The image processing apparatus according to claim 1, wherein
   the gain calculating unit calculates, for each of the one or more remaining input images, the brightness ratio of each of the one or more remaining input images to the reference image as the gain, based on information of brightness components of reduced images obtained by reducing each of the plurality of pieces of input images.

4. The image processing apparatus according to claim 1, wherein
   the weight calculating unit,
   with respect to each of the one or more remaining input images whose value of the calculated gain is smaller than a predetermined value, calculates the one or more first weights to increase a weight for a high brightness part of the one or more remaining input images, and,
   with respect to each of the one or more remaining input images whose value of the calculated gain is larger than the predetermined value, calculates the one or more first weights to increase a weight for a low brightness part of the one or more remaining input images.

5. The image processing apparatus according to claim 1, wherein
   the weight calculating unit calculates a ratio determined to make a maximum brightness value of the image data as a result of performing the weighting synthesis calculation on the plurality of pieces of input images using the one or more first weights correspond to a maximum value in a predetermined "N"-bit tone as a result of extending a dynamic range, as the second weight.

6. The image processing apparatus according to claim 1, wherein
   the preparing unit extracts, from the information of the shape of the brightness distribution of the high-contrast image being generated and the information of the shape of the predetermined brightness distribution as the conversion target, information indicating a correspondence between a brightness value of the high-contrast image being a conversion source and a brightness value of the output image being a conversion destination, and prepares the tone conversion curve indicating the characteristic of the tone conversion based on the information being extracted.

7. The image processing apparatus according to claim 1, wherein
   the preparing unit prepares the tone conversion curve indicating the characteristic of the tone conversion, based on information of a shape of a brightness distribution formed by only pixels that belong to a tone range predetermined or specified by a user out of a tone range of the high-contrast image and the information of the shape of the brightness distribution as the conversion target.

8. The image processing apparatus according to claim 1, wherein
   the information of the shape of the brightness distribution is information of a shape of an accumulated histogram.

9. The image processing apparatus according to claim 1, wherein
   the high-contrast image being the synthetic image having the wide tonal range is an image whose number of tones is larger than number of tones of the plurality of pieces of input images.

10. An image processing method generating, based on a high-contrast image being a synthetic image whose dynamic range is extended and having a wide tonal range achieved by synthesizing a plurality of pieces of input images obtained by shooting a same scene and having different exposure amounts, an output image having a narrower tonal range than the high-contrast image, the image processing method comprising:

a selecting step selecting a reference image from the plurality of pieces of input images based on information of brightness components of the plurality of pieces of input images;

a gain calculating step calculating, for each of one or more remaining input images, which are the plurality of pieces of input images excluding the reference image, a brightness ratio of each of the one or more remaining input images to the reference image as a gain, based on the information of the brightness components of the plurality of pieces of input images;

a weight calculating step calculating one or more first weights to be applied to the one or more remaining input images based on the gain being calculated and information of a brightness component of the reference image, and calculating a second weight based on information of a brightness component of image data as a result of performing weighting synthesis calculation on the plurality of pieces of input images using the one or more first weights;

an intermediate image generating step generating the high-contrast image by performing weighting synthesis on the plurality of pieces of input images using the one or more first weights and the second weight being calculated;

a preparing step preparing, based on information of a shape of a brightness distribution of the high-contrast image being generated and information of a shape of a predetermined brightness distribution as a conversion target, a tone conversion curve indicating a characteristic of tone conversion; and an output image generating step performing the tone conversion on the high-contrast image based on the tone conversion curve being prepared, and generating the output image having the narrower tonal range than the high-contrast image.

11. The image processing method according to claim 10, wherein the selecting step selects, based on information of brightness components of reduced images obtained by reducing each of the plurality of pieces of input images, one piece of input image having a widest effective range of a brightness distribution among the plurality of pieces of input images as the reference image.

12. The image processing method according to claim 10, wherein the gain calculating step calculates, for each of the one or more remaining input images, the brightness ratio of each of the one or more remaining input images to the reference image as the gain, based on information of brightness components of reduced images obtained by reducing each of the plurality of pieces of input images.

13. The image processing method according to claim 10, wherein the weight calculating step, with respect to each of the one or more remaining input images whose value of the calculated gain is smaller than a predetermined value, calculates the one or more first weights to increase a weight for a high brightness part of the one or more remaining input images, and, with respect to each of the one or more remaining input images whose value of the calculated gain is larger than the predetermined value, calculates the one or more first weights to increase a weight for a low brightness part of the one or more remaining input images.

14. The image processing method according to claim 10, wherein the weight calculating step calculates a ratio determined to make a maximum brightness value of the image data as a result of performing the weighting synthesis calculation on the plurality of pieces of input images using the one or more first weights correspond to a maximum value in a predetermined "N"-bit tone as a result of extending a dynamic range, as the second weight.

15. The image processing method according to claim 10, wherein the preparing step extracts, from the information of the shape of the brightness distribution of the high-contrast image being generated and the information of the shape of the predetermined brightness distribution as the conversion target, information indicating a correspondence between a brightness value of the high-contrast image being a conversion source and a brightness value of the output image being a conversion destination, and prepares the tone conversion curve indicating the characteristic of the tone conversion based on the information being extracted.

16. The image processing method according to claim 10, wherein the preparing step prepares the tone conversion curve indicating the characteristic of the tone conversion, based on information of a shape of a brightness distribution formed by only pixels that belong to a tone range predetermined or specified by a user out of a tone range of the high-contrast image and the information of the shape of the brightness distribution as the conversion target.

17. The image processing method according to claim 10, wherein the information of the shape of the brightness distribution is information of a shape of an accumulated histogram.

18. The image processing method according to claim 10, wherein the high-contrast image being the synthetic image having the wide tonal range is an image whose number of tones is larger than number of tones of the plurality of pieces of input images.

\* \* \* \* \*